(12) United States Patent
Seo et al.

(10) Patent No.: US 9,088,394 B2
(45) Date of Patent: Jul. 21, 2015

(54) METHOD AND APPARATUS FOR INTER-CELL INTERFERENCE COORDINATION IN A WIRELESS COMMUNICATION SYSTEM

(75) Inventors: Hanbyul Seo, Anyang-si (KR); Byounghoon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 75 days.

(21) Appl. No.: 13/980,243

(22) PCT Filed: Feb. 3, 2012

(86) PCT No.: PCT/KR2012/000641
§ 371 (c)(1),
(2), (4) Date: Jul. 17, 2013

(87) PCT Pub. No.: WO2012/105766
PCT Pub. Date: Aug. 9, 2012

(65) Prior Publication Data
US 2013/0295949 A1    Nov. 7, 2013

Related U.S. Application Data

(60) Provisional application No. 61/445,000, filed on Feb. 21, 2011, provisional application No. 61/439,923, filed on Feb. 6, 2011, provisional application No. 61/441,255, filed on Feb. 9, 2011.

(51) Int. Cl.
| | |
|---|---|
| H04L 5/00 | (2006.01) |
| H04W 52/04 | (2009.01) |
| H04W 74/02 | (2009.01) |
| H04J 11/00 | (2006.01) |
| H04W 72/08 | (2009.01) |
| H04W 72/04 | (2009.01) |

(52) U.S. Cl.
CPC ............ *H04L 5/0032* (2013.01); *H04J 11/005* (2013.01); *H04L 5/0073* (2013.01); *H04W 72/0426* (2013.01); *H04W 72/082* (2013.01)

(58) Field of Classification Search
None
See application file for complete search history.

(56) References Cited

U.S. PATENT DOCUMENTS

| | | |
|---|---|---|
| 2009/0264077 A1 | 10/2009 | Damnjanovic |
| 2010/0267408 A1 | 10/2010 | Lee et al. |
| 2011/0310786 A1* | 12/2011 | Qin et al. ...................... 370/312 |
| 2012/0087266 A1* | 4/2012 | Vajapeyam et al. ........... 370/252 |
| 2012/0147826 A1* | 6/2012 | Teck et al. ..................... 370/329 |

(Continued)

FOREIGN PATENT DOCUMENTS

| | | |
|---|---|---|
| KR | 10-2009-0102419 A | 9/2009 |
| KR | 10-2010-0068152 A | 6/2010 |

(Continued)

*Primary Examiner* — Kimberly A Williams
(74) *Attorney, Agent, or Firm* — Birch, Stewart, Kolasch & Birch, LLP

(57) ABSTRACT

The present invention relates to a wireless communication system, and more particularly, to a method and apparatus for performing inter-cell interference coordination in a wireless communication system. According to the present invention, a method is provided in which, when ICIC information exists both in a time resource and a frequency resource, the determination of whether or not to apply frequency resource ICIC information is carried out on the basis of time resource ICIC information in an ICIC-related cell, and the location of a resource to which ICIC is applied is accurately determined, to thereby enable an ICIC operation to be performed in an accurate and effective manner.

7 Claims, 9 Drawing Sheets

(56) References Cited

U.S. PATENT DOCUMENTS

| | | | |
|---|---|---|---|
| 2013/0194984 A1* | 8/2013 | Cheng et al. | 370/294 |
| 2014/0119332 A1* | 5/2014 | Kim et al. | 370/330 |
| 2014/0126403 A1* | 5/2014 | Siomina | 370/252 |
| 2015/0016289 A1* | 1/2015 | Yun et al. | 370/252 |
| 2015/0029907 A1* | 1/2015 | Cucala Garcia | 370/329 |

FOREIGN PATENT DOCUMENTS

| | | |
|---|---|---|
| KR | 10-2010-0115653 A | 10/2010 |
| KR | 10-2010-0133492 A | 12/2010 |

* cited by examiner (a)

(b)

METHOD AND APPARATUS FOR INTER-CELL INTERFERENCE COORDINATION IN A WIRELESS COMMUNICATION SYSTEM

CROSS REFERENCE TO RELATED APPLICATIONS

This application is the National Phase of PCT/KR2012/000641 filed on Feb. 3, 2012, which claims priority under 35 U.S.C. 119(e) to U.S. Provisional Application Nos. 61/439,923, 61/441,255, and 61/445,000 filed on Feb. 6, 2011, Feb. 9, 2011, and Feb. 21, 2011 respectively, all of which are hereby expressly incorporated by reference into the present application.

TECHNICAL FIELD

A following description relates to a wireless communication system, and more particularly, to a method of performing inter-cell interference coordination in a wireless communication and apparatus therefor.

BACKGROUND ART

FIG. 1 is a diagram of a heterogeneous network wireless communication system 100 including a macro base station and a micro base station. In this specification, a terminology of a heterogeneous network means a network in which the macro base station 110 and micro base stations 121/122 co-exist although an identical Radio Access Technology (RAT) is used.

The macro base station 110 means a general base station of a wireless communication system having a wide coverage and high transmit power. The macro base station may be called a macro cell.

For instance, the micro base station 121/122 can be called a micro cell, a pico cell, a femto cell, a home eNB (HeNB), a relay, or the like. The micro base station 121/122 is a small version of the macro base station 110 and can operate independently in a manner of performing most of functions of the macro base station. The micro base station is sort of a base station installed (overlay) in an area covered by the macro base station or the base station installable (non-overlay) in a radio shadow area where the macro base station is not able to cover. Compared to the macro base station 110, the micro base station 121/122 can accommodate small numbers of user equipments with a narrower coverage and lower transmit power.

A user equipment 131 can be directly served from the macro base station 110 (hereinafter a macro UE) and a user equipment 132 can be served from the micro base station 122 as well (hereinafter a micro UE). In some cases, the user equipment 132 existing in the coverage of the micro base station 122 may be served from the macro base station 110.

According to whether an access restriction is applied to a user equipment, the micro base station can be classified into two types. A first type corresponds to a Closed Subscriber Group (CSG) micro base station and a second type corresponds to an Open Access (OA) or an Open Subscriber Group (OSC) micro base station. The CSG micro base station can serve permitted specific user equipments and the OSG micro base station can serve all user equipments without any separate access restriction.

DISCLOSURE OF THE INVENTION

Technical Task

In the aforementioned heterogeneous network, if a user equipment served by the macro base station is adjacent to the micro base station, interference can occur in a downlink signal received by the macro UE from the macro base station due to a strong downlink signal from the micro base station. Or, the user equipment served by the micro base station can be strongly interfered by the downlink signal of the macro base station. As mentioned earlier, if one cell is strongly interfered by a neighboring cell, the neighboring cell may perform an Inter-Cell Interference Coordination (ICIC) to reduce/eliminate interference in a manner of restricting the transmission of the neighboring cell in a part of resource region (e.g., a part of subframe).

The ICIC can be performed in a time resource or a frequency resource. For instance, one cell can inform a neighboring cell(s) of a size of downlink/uplink interference (or transmit power) on a specific frequency domain. Or, one cell can inform the neighboring cell(s) of the time domain where the cell does not perform a downlink/uplink scheduling. According to a legacy scheme, the ICIC on the frequency resource is defined that the ICIC is applied without a decision on the time resource (i.e., all time resources) and the ICIC in the time resource is defined that the ICIC is applied without a decision on the frequency resource (i.e., all frequency resources). Hence, if both the ICIC in the time resource and the ICIC on the frequency resource are simultaneously applied, there may exist a problem of not capable of specifying the time and frequency resource to which the ICIC is applied.

A technical task of the present invention is to provide a method of enabling an ICIC operation to be correctly and efficiently performed in a manner of clearly specifying a resource position to which the ICIC is applied by determining whether frequency resource ICIC information is applied based on time resource ICIC information, even in case that the ICIC in the time resource and the ICIC on the frequency resource are coexist.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment of the present invention, a method of performing an inter-cell interference coordination (ICIC) in a wireless communication system includes the steps of receiving a time domain ICIC information of a first cell and a frequency domain ICIC information of the first cell from the first cell by a second cell, assuming validity of the frequency domain ICIC information of the first cell based on the time domain ICIC information of the first cell by the second cell, and performing an uplink or a downlink scheduling by the second cell based on a result of the assuming step.

To achieve these and other advantages and in accordance with the purpose of the present invention, as embodied and broadly described, according to a different embodiment of the present invention, a method of performing an inter-cell interference coordination (ICIC) in a wireless communication system includes the steps of transmitting a time domain ICIC information of a first cell and a frequency domain ICIC information of the first cell to a second cell by the first cell, predicting a result of assumption performed by the second cell for validity of the frequency domain ICIC information of the first cell based on the time domain ICIC information of the first cell, and performing an uplink or a downlink scheduling by the first cell based on the result of prediction.

In order to solve the aforementioned technical task, according to a different embodiment of the present invention, a base station of a second cell performing an inter-cell interference coordination (ICIC) in a wireless communication system includes a transceiving module configured to transmit and receive a signal with a first cell and a processor configured to control the base station including the transceiving module, the processor configured to receive a time domain ICIC information of the first cell and a frequency domain ICIC information of the first cell from the first cell via the transceiving module, the processor configured to assume validity of the frequency domain ICIC information of the first cell based on the time domain ICIC information of the first cell, the processor configured to perform an uplink or a downlink scheduling of the second cell based on a result of the assumption.

In order to solve the aforementioned technical task, according to a further different embodiment of the present invention, a base station of a first cell performing an inter-cell interference coordination (ICIC) in a wireless communication system includes a transceiving module configured to transmit and receive a signal with a second cell and a processor configured to control the base station including the transceiving module, the processor configured to transmit a time domain ICIC information of the first cell and a frequency domain ICIC information of the first cell to the second cell via the transceiving module, the processor configured to predict a result of assumption of the second cell for validity of the frequency domain ICIC information of the first cell based on the time domain ICIC information of the first cell, the processor configured to perform an uplink or a downlink scheduling of the first cell based on a result of the prediction.

In the embodiments according to the present invention, following description can be commonly applied.

The time domain ICIC information of the first cell can include a silent subframe configuration information of the first cell.

The assuming step can include the step of assuming that the frequency domain ICIC information of the first cell is not valid in a downlink subframe n, which is configured as a silent subframe by the first cell.

The frequency domain ICIC information assumed to be invalid may correspond to an RNTP (relative narrowband transmission power) of the first cell.

The assuming step can include the step of assuming that the frequency domain ICIC information of the first cell is not valid in a uplink subframe n+k corresponding to a downlink subframe n, which is configured as a silent subframe by the first cell.

The frequency domain ICIC information assumed to be invalid can include at least one of an IOI (interference overhead indication) or an HII (high interference indication).

Scheduling information on an uplink transmission in the uplink subframe n+k can be transmitted in the downlink subframe n.

The assuming step can include the step of assuming that the frequency domain ICIC information of the first cell is valid in a subframe, which is not configured as a silent subframe by the first cell.

The method can further include the step of determining a time resource and a frequency resource used to measure interference in the second cell based on a result of the assuming step.

The method further includes the step of receiving an information indicating a resource region where the frequency domain ICIC information of the first cell is valid from the first cell and wherein the assuming step can be performed based on the information indicating the resource region where the frequency domain ICIC information of the first cell is valid.

The resource region where the frequency domain ICIC information of the first cell is valid can be determined on a time resource and a frequency resource.

The silent subframe may correspond to a subframe configured as an ABS (almost blank subframe) by the first cell.

The above-mentioned general description for the present invention and the following details of the present invention may be exemplary and are provided for the additional description for the inventions in the appended claims.

Advantageous Effects

According to the present invention, a method of enabling an ICIC operation to be correctly and efficiently performed in a manner of clearly specifying a resource position to which the ICIC is applied by determining whether frequency resource ICIC information is applied based on time resource ICIC information can be provided.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
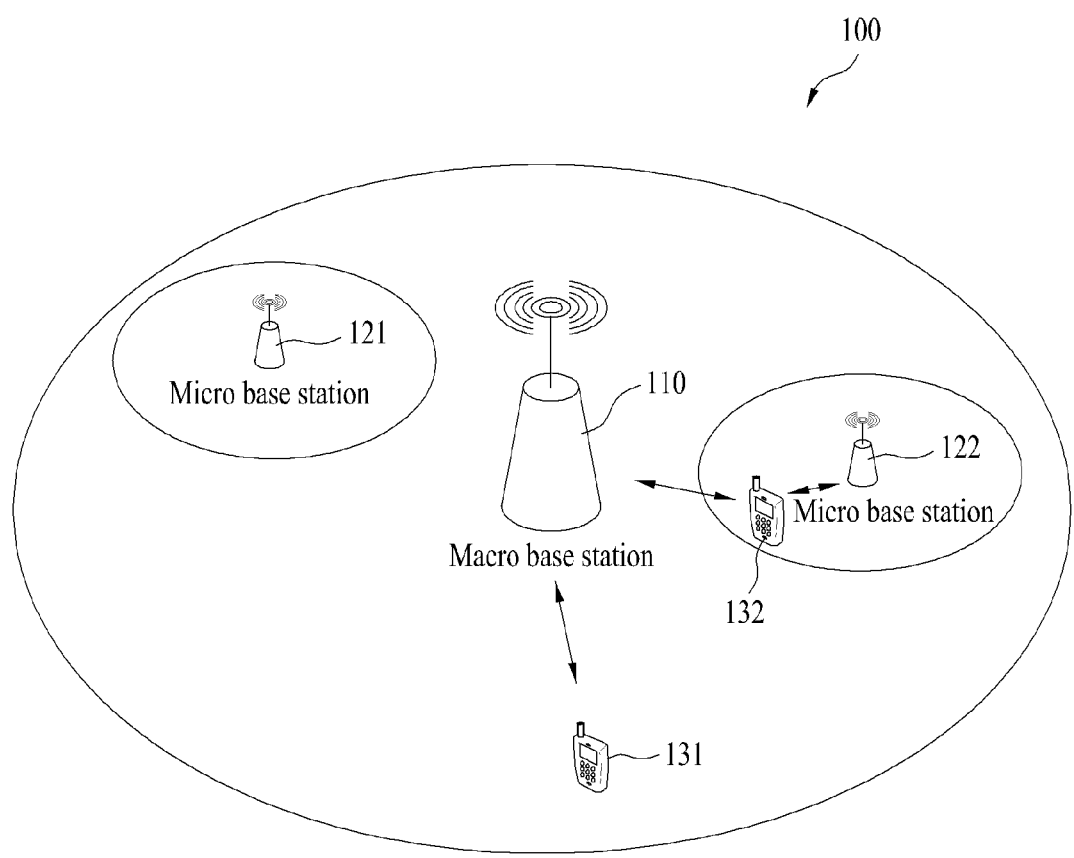
FIG. 1 is a diagram of a heterogeneous network wireless communication system 100 including a macro base station and a micro base station.

The embodiments in the following description may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment.

In this specification, embodiments of the present invention are described centering on the data transmission/reception relations between a base station and a user equipment. In this case, the base station means a terminal node of a network directly performing a communication with the user equipment. In this disclosure, a specific operation explained as performed by a base station can be occasionally performed by an upper node of the base station.

In particular, in a network constructed with a plurality of network nodes including a base station, it is apparent that various operations performed for communication with a user equipment can be performed by a base station or other networks except the base station. In this case, 'base station' can be replaced by such a terminology as a fixed station, a Node B, an eNode B (eNB), an access point, and the like. A relay can be replaced by such a terminology as a relay node (RN), a relay station (RS), and the like. And, 'terminal' can be replaced by such a terminology as a user equipment (UE), a mobile station (MS), a mobile subscriber station (MSS), a subscriber station (SS), and the like.

Specific terminologies used in the following description are provided to help the understanding of the present invention and can be modified to a different form in a scope of not deviating from the technical idea of the present invention.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Embodiments of the present invention can be supported by the standard documents disclosed in at least one of IEEE 802 system, a 3GPP system, 3GPP LTE/LTE-A (LTE-Advanced), and a 3GPP2 system, which correspond to wireless access systems. In particular, steps or parts among the embodiments of the present invention, which are not explained to clearly disclose the technical idea of the present invention, can be supported by the documents. And, all terminologies disclosed in the present specification can be explained by the standard document.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA and adopts OFDMA in downlink and adopts SC-FDMA in uplink. LTE-A (LTE-Advanced) is an evolved version of 3GPP LTE. WiMAX can be explained by IEEE 802.16e standard (WirelessMAN-OFDMA Reference System) and advanced IEEE 802.16m standard (WirelessMAN-OFDMA Advanced System). For clarity, the following description mainly concerns 3GPP LTE system or 3GPP LTE-A system, by which the technical idea of the present invention may be non-limited.

Figure 2:
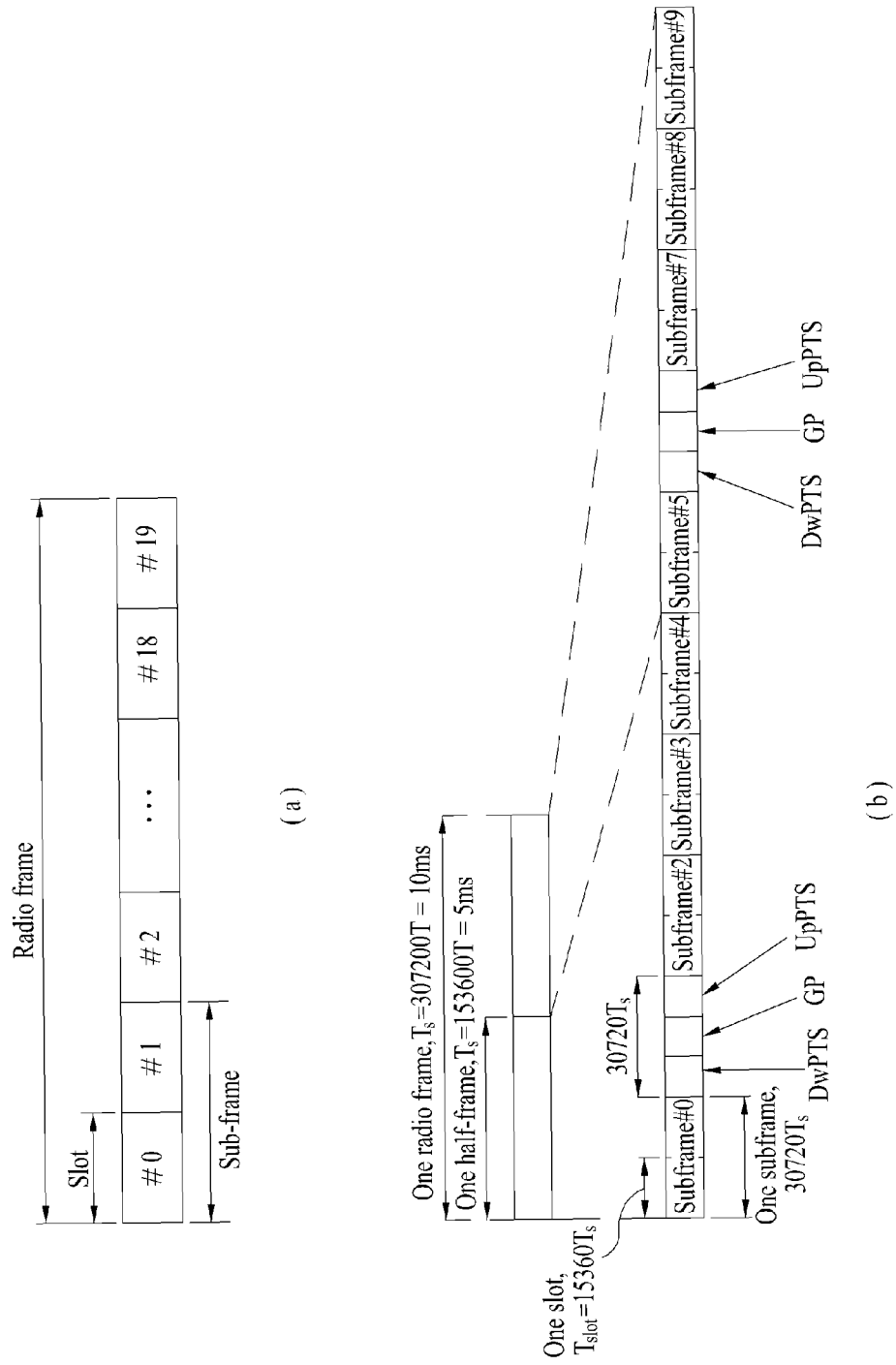
FIG. 2 is a diagram for a structure of a downlink radio frame.

A structure of a downlink radio frame is explained with reference to FIG. 2.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 2(a) is a diagram for a structure of a downlink radio frame of type 1. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDMA in downlink, OFDM symbol is provided to indicate one symbol period. The OFDM symbol may be named SC-FDMA symbol or symbol period. Resource block (RB) is a resource allocation unit and may include a plurality of contiguous subcarriers in one slot.

The number of OFDM symbols included in one slot may vary in accordance with a configuration of a cyclic prefix (CP). The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 2(b) is a diagram for a structure of a downlink radio frame of type 2. A type-2 radio frame includes 2 half frames. Each of the half frame consists of 5 subframes, a downlink pilot time slot (DwPTS), a guard period (GP), and an uplink pilot time slot (UpPTS) and one subframe consists of two slots. The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink. Meanwhile, one subframe consists of two slots irrespective of a type of a radio frame.

The above-described structures of the radio frame are exemplary only. And, the number of subframes included in a radio frame, the number of slots included in the subframe and the number of symbols included in the slot may be modified in various ways.

Figure 3:
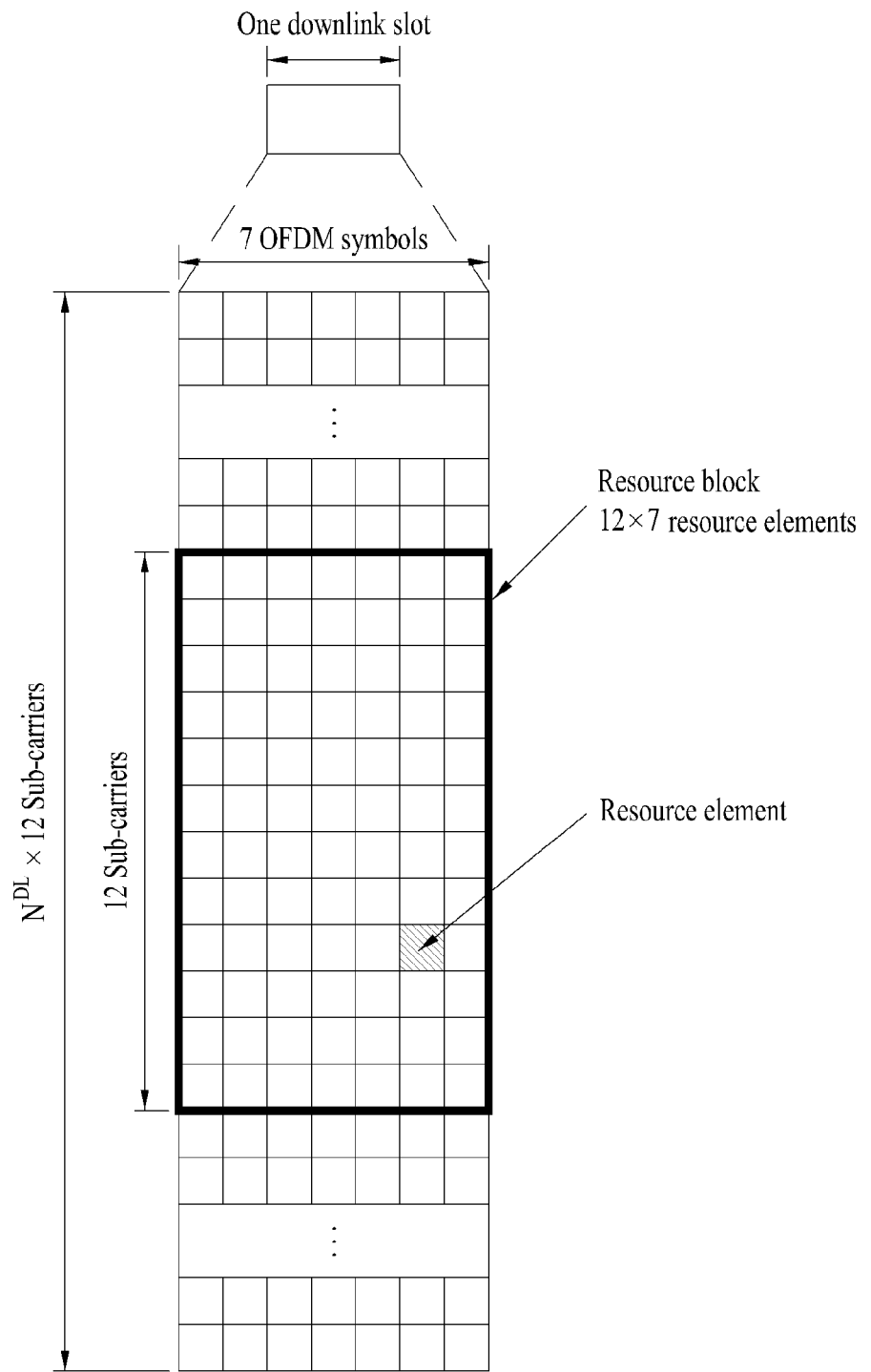
FIG. 3 is a diagram for a resource grid in a downlink slot.

FIG. 3 is a diagram for a resource grid in a downlink slot. One downlink (DL) slot includes 7 OFDM symbols in time domain and one resource block (RB) includes 12 subcarriers in frequency domain, by which the present invention may be non-limited. For instance, in case of a normal CP (cyclic prefix), one slot includes 7 OFDM symbols. In case of an extended CP, one slot may include 6 OFDM symbols. Each element on a resource grid is called a resource element. One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 4:
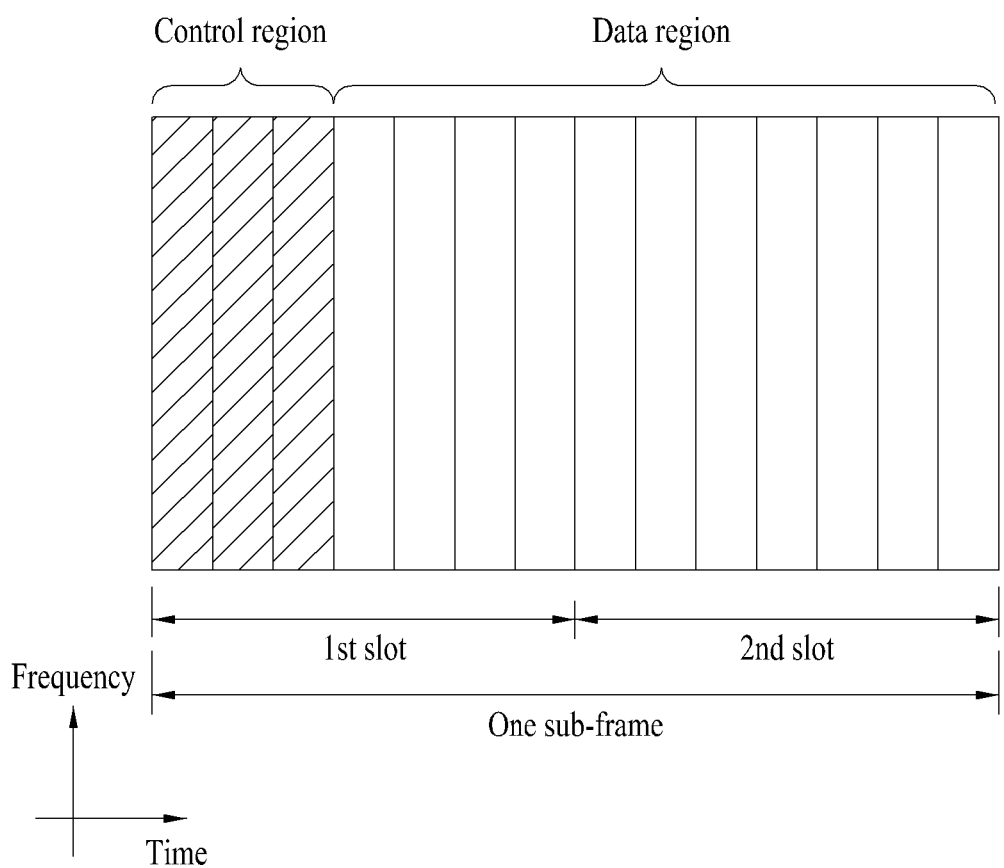
FIG. 4 is a diagram for a structure of a downlink subframe.

FIG. 4 is a diagram for a structure of a downlink subframe. Maximum 3 OFDM symbols situated in a head part of a first slot of one subframe correspond to a control region to which control channels are allocated. The rest of OFDM symbols correspond to a data region to which PDSCH (physical downlink shared channel) is allocated. Examples of DL control channels used by 3GPP LTE may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH is a response channel in response to UL transmission and includes ACK/NACK (acknowledgement/non-acknowledgement) signal for HARQ (hybrid automatic repeat request). Control information carried on PDCCH may be called downlink control information (hereinafter abbreviated DCI). The DCI may include UL scheduling information, DL scheduling information, or a UL transmit power control command for a random UE (user equipment) group. PDCCH is able to include a transmission format of DL-SCH (downlink shared channel) and resource allocation, resource allocation information on UL-SCH (uplink shared channel), paging information on PCH (paging channel), system information on DL-SCH, resource allocation information of an upper layer control message such as a random access response transmitted on PDSCH, a set of a transmit power control command for individual user equipments within a random user equipment (UE) group, transmit power control information, activation of VoIP (voice over IP) and the like. A plurality of PDCCHs can be transmitted in a control region and a user equipment is able to monitor a plurality of the PDCCHs. PDCCH is transmitted with the aggregation of at least one or more contiguous CCEs (control channel elements). CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs. A base station determines PDCCH format in accordance with DCI transmitted to a user equipment and attaches CRC (cyclic redundancy check) to control information. The CRC is masked with a unique identifier (called RNTI (radio network temporary identifier)) in accordance with an owner or usage of PDCCH. If the PDCCH is provided for a specific user equipment, the CRC can be masked with a unique identifier of the user equipment, i.e., C-RNTI (i.e., Cell-RNTI). As a different example, if the PDCCH is provided for a paging message, the CRC can be masked with a paging indication identifier (e.g., P-RNTI (Paging-RNTI)). If the PDCCH is provided for system information (more specifically, for a system information block (SIB)), the CRC can be masked with a system information identifier (e.g., SI-RNTI (system information-RNTI)). In order to indicate a random access response that is a response to a transmission of a random access preamble of a user equipment, CRC can be masked with RA-RNTI (random access-RNTI).

Figure 5:
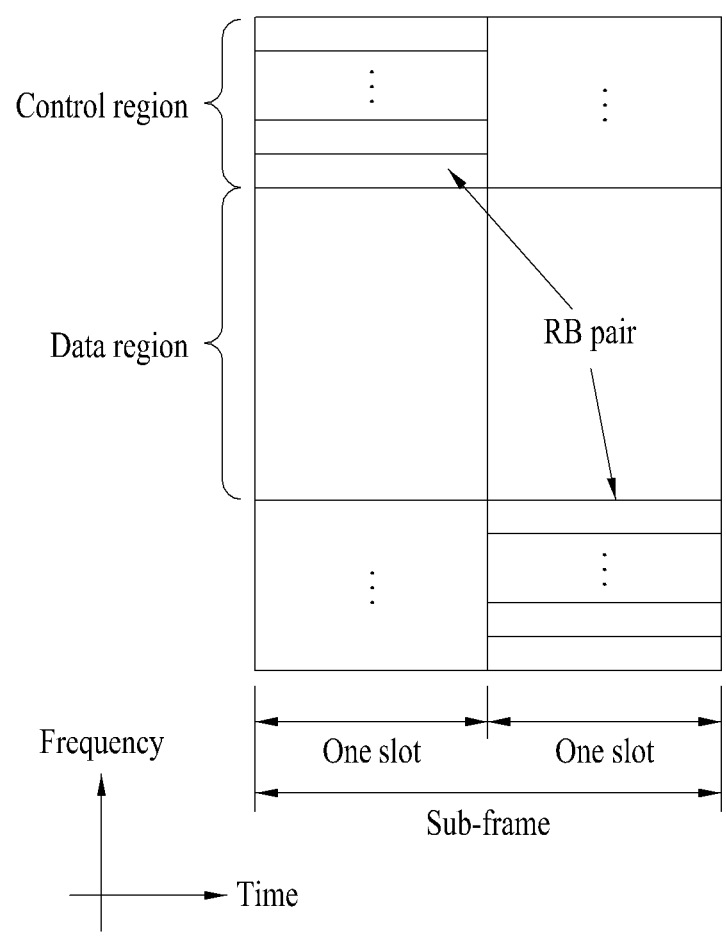
FIG. 5 is a diagram for a structure of an uplink subframe.

FIG. 5 is a diagram for a structure of an uplink subframe. A UL subframe may be divided into a control region and a data region in frequency domain. PUCCH (physical uplink control channel) including UL control information is assigned to the control region. PUSCH (physical uplink shared channel) including a user data is assigned to the data region. In order to maintain single carrier characteristic, a user equipment does not transmit PUCCH and PUSCH at the same time. PUCCH for one user equipment is assigned to a resource block pair (RB pair) in a subframe. Resource blocks belonging to the RB pair occupy a subframe different from each other for 2 slots. This is called that the RB pair assigned to PUCCH is frequency-hopped on a slot boundary.

Modeling of Multi-Antenna (MIMO) System

Figure 6:
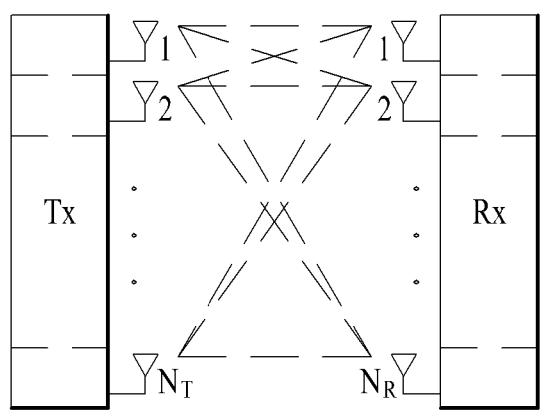
FIG. 6 is a structured diagram of a radio communication system having multiple antennas.
Figure 6:
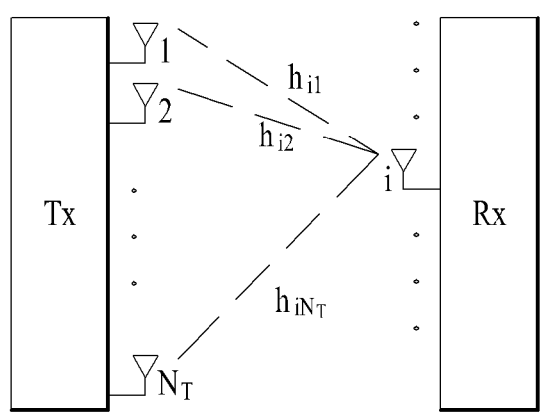

FIG. 6 is a structured diagram of a radio communication system having multiple antennas.

As depicted in FIG. 6(a), unlike a case that a plurality of antennas are used in either a transmitter or a receiver only, if the number of transmitting antenna and the number of receiving antenna are increased to $N_T$ and $N_R$, respectively, a theoretical channel transmission capacity is increased in proportional to the number of antenna. Consequently, a transfer rate is enhanced and frequency efficiency is dramatically enhanced. As the channel transmission capacity increases, the transfer rate can be theoretically increased as much as the maximum transfer rate ($R_o$) in case of using a single antenna multiplied by a rate of increase ($R_i$).

$$R_i = \min(N_T, N_R) \qquad \text{[Formula 1]}$$

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a $3^{rd}$ generation mobile communication, a next generation wireless LAN and the like.

If we look at the research trend related to the multi-antenna until now, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

A communication method in the multi-antenna system is explained in more detail using a mathematical modeling. Assume that there exist $N_T$ number of transmitting antenna and $N_R$ number of receiving antenna in the system.

First of all, if we look into a transmission signal, in case that there exists $N_T$ number of transmitting antenna, transmission information can be represented as a vector in the following Formula 2.

$$s=[s_1,s_2,\ldots,s_{N_T}]^T \quad \text{[Formula 2]}$$

Meanwhile, for each of the transmission informations $s_1$, $s_2, \ldots, s_{N_T}$, a transmit power may vary according to the each of the transmission informations. In this case, if each of the transmit powers is represented as $P_1, P_2, \ldots P_{N_T}$, transmit power-adjusted transmission information can be represented as a vector in the following Formula 3.

$$\hat{s}=[\hat{s}_1,\hat{s}_2,\ldots,\hat{s}_{N_T}]^T=[P_1 s_1, P_2 s_2, \ldots, P_{N_T} s_{N_T}]^T \quad \text{[Formula 3]}$$

And, if $\hat{s}$ is represented using a diagonal matrix P, it can be represented as a following Formula 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 4]}$$

Meanwhile, let's consider a case that the $N_T$ number of transmission signal $x_1, x_2, \ldots x_{N_T}$, which is practically transmitted, is configured in a manner of applying a weighted matrix W to the adjusted information vectors $\hat{s}$. In this case, the weighted matrix W plays a role in distributing the transmission information to each of the antennas according to the situation of the transmission channel and the like. The transmission signal $x_1, x_2, \ldots, x_{N_T}$ can be represented using a vector X in the following Formula 5.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Formula 5]}$$

In this case, $W_{ij}$ means a weighting between an $i^{th}$ transmitting antenna and $j^{th}$ information. The W is called a precoding matrix as well.

If there exists $N_R$ number of receiving antenna, a reception signal for each antenna can be represented as a vector in the following Formula 6.

$$y=[y_1,y_2,\ldots y_{N_R}]^T \quad \text{[Formula 6]}$$

In case of modeling a channel in a multi-antenna wireless communication system, the channel can be distinguished by a transmitting and receiving antenna index. The channel passing through a transmitting antenna j to receiving antenna i is represented as $h_{ij}$. According to the $h_{ij}$, it should be cautious that a receiving antenna index comes first and a transmitting antenna index comes later.

Meanwhile, FIG. 6(b) is a diagram of channels passing through from $N_T$ number of transmitting antennas to the receiving antenna i. The channels can be represented as a vector and a matrix form in a manner of being collected. According to FIG. 6(b), a channel starting from the total $N_T$ number of transmitting antennas and arriving at the receiving antenna i can be represented as follows.

$$h_i^T=[h_{i1},h_{i2},\ldots,h_{iN_T}] \quad \text{[Formula 7]}$$

Hence, all channels starting from the $N_T$ number of transmitting antennas and arriving at the $N_R$ number of receiving antennas can be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Formula 8]}$$

Practically, after passing through the channel matrix H, an Additive White Gaussian Noise (AWGN) is added to the channel. The Additive White Gaussian Noise (AWGN) added to the each of the $N_R$ number of receiving antennas can be represented as follows.

$$n=[n_1,n_2,\ldots,n_{N_R}]^T \quad \text{[Formula 9]}$$

According to the aforementioned mathematical modeling, a reception signal can be represented as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Formula 10]}$$

$$Hx + n$$

Numbers of column and row of the channel matrix H, which indicates a state of a channel, is determined by the number of transmitting/receiving antenna. In the channel matrix H, the number of row corresponds to the number of receiving antennas $N_R$ and the number of column corresponds to the number of transmitting antennas $N_T$. In particular, the channel matrix H corresponds to a matrix of $N_R \times N_T$.

Since a rank of the channel matrix is defined by a minimum number of the numbers of row or column independent from each other, the rank of the matrix is configured not to be greater than the number of the row or the column. The rank rank (H) of the channel matrix H is restricted as follows.

$$\text{rank}(H) \leq \min(N_T, N_R) \quad \text{[Formula 11]}$$

According to a different definition for a rank, the rank can be defined by the number of Eigen values, which is not 0, when a matrix is processed by Eigen value decomposition. Similarly, according to a further different definition for a rank, the rank can be defined by the number of singular values, which is not 0, when a matrix is processed by singular value decomposition. Hence, physical meaning of the rank in the channel matrix may correspond to a maximum number capable of transmitting information different from each other in a given channel.

Coordinated Multi-Point (CoMP)

According to an improved system performance requirement of a 3GPP LTE-A system, a CoMP transmission/reception technology MIMO (represented as a co-MIMO, a collaborative MIMO, a network MIMO, or the like) is proposed. The CoMP technology increases the performance of a user equipment situating at a cell edge and can increase an average sector throughput.

In general, in a multi-cell environment where a frequency reuse factor corresponds to 1, the performance of a user equipment situating at a cell boundary and the average sector throughput can be reduced due to inter-cell interference (ICI). In order to reduce the ICI, a legacy LTE system applied a method for enabling the user equipment situating at a cell boundary to have an appropriate throughput performance using such a simple passive scheme as a fractional frequency reuse (FFR) via a UE-specific power control in an environment limited by the interference. Yet, it may be more preferable to reduce the ICI or reuse the ICI as a signal that the user equipment wants than to lower the use of a frequency resource per cell. In order to achieve the aforementioned purpose, CoMP transmission scheme can be applied.

The CoMP scheme applicable in DL can be largely classified into a joint processing (JP) scheme and a coordinated scheduling/beamforming (CS/CB) scheme.

The JP scheme can use a data in each point (base station) of a CoMP cooperative unit. The CoMP cooperative unit means a set of base stations used for a cooperative transmission scheme. The JP scheme can be classified into a joint transmission scheme and a dynamic cell selection scheme.

The joint transmission scheme indicates a scheme transmitting PDSCH from a plurality of points (a part or entire CoMP cooperative units) at a time. In particular, the data transmitted to single user equipment can be simultaneously transmitted from a plurality of transmission points. According to the joint transmission scheme, quality of a reception signal can be coherently or non-coherently enhanced. And, interference for a different user equipment can be actively eliminated.

The dynamic cell selection scheme indicates a scheme transmitting PDSCH from a point (of a CoMP cooperative unit) at a time. In particular, a data transmitted to single user equipment on a specific timing point is transmitted from one point. A different point within the cooperative unit does not transmit a data to the corresponding user equipment on the specific timing point. The point transmitting the data to the corresponding user equipment can be dynamically selected.

Meanwhile, according to CS/CB scheme, the CoMP cooperative units can cooperatively perform a beamforming of data transmission for single user equipment. In this case, although the data is transmitted from a serving cell only, a user scheduling/beamforming can be determined by a coordination of cells in a corresponding CoMP cooperative unit.

Meanwhile, in case of UL, a coordinated multi-point reception means to receive a signal transmitted by coordination of a plurality of points, which are geographically apart from each other. The CoMP scheme applicable to a case of UL can be classified into a joint reception (JR) and the coordinated scheduling/beamforming (CS/CB).

The JR scheme means that a signal transmitted on PUSCH is received by a plurality of receiving points. The CS/CB scheme means that PUSCH is received at one point and a user scheduling/beamforming is determined by coordination of cells in a CoMP cooperative unit.

If the aforementioned CoMP system is used, a user equipment can be jointly supported with a data from a multi-cell base station. And, by simultaneously supporting at least one user equipment using a same radio frequency resource, each base station can enhance system performance. And, the base station may perform a space division multiple access (SDMA) scheme based on channel state information between the base station and the user equipment.

In a CoMP system, a serving base station and one or more cooperative base stations are connected to a scheduler via a backbone network. The scheduler can operate in a manner of being fed back channel information on a channel state between a user equipment and a cooperative base station, which is measured by the each base station via the backbone network. For instance, the scheduler can schedule information for the serving base station and one or more cooperative base stations to perform a cooperative MIMO operation. In particular, the scheduler can directly give a direction for the cooperative MIMO operation to each base station.

As mentioned in the foregoing description, the CoMP system may correspond to a virtual MIMO system operating in a manner of bundling up a plurality of cells into a group. Basically, a communication technique of a MIMO system using multi-antenna can be applied to the CoMP system.

Downlink Channel State Information (CSI) Feedback

A MIMO scheme can be divided into an open-loop scheme and a closed-loop scheme. The open-loop MIMO scheme means to perform MIMO transmission in a transmitting end without a feedback of channel state information from a MIMO receiving end. The closed-loop MIMO scheme means to perform the MIMO transmission in the transmitting end by receiving the feedback of the channel state information from the MIMO receiving end. Each of the transmitting end and the receiving end can perform beamforming based on the channel state information to obtain multiplexing gain of the MIMO transmission antenna in the closed-loop MIMO scheme. The transmitting end (e.g., base station) can assign a UL control channel or a UL shared channel to the receiving end (e.g., UE) in order for the receiving end (e.g., UE) to feedback the channel state information.

The channel state information (CSI) to be fed back may include a rank indicator (RI), a precoding matrix index (PMI), and a channel quality indicator (CQI).

The RI corresponds to information on a channel rank. The channel rank means maximum numbers of layer (or stream) capable of transmitting information different from each other via an identical time-frequency resource. Since a rank value is mainly determined by a long term fading of a channel, the rank value can be fed back with a longer interval (i.e., less frequently) compared to the PMI and the CQI in general.

The PMI corresponds to information on a precoding matrix used for transmitting from the transmitting end. The PMI is a value reflecting characteristics of space of a channel. A precoding means to map a transmission layer to a transmission antenna and a layer-antenna mapping relationship can be determined by a precoding matrix. The PMI corresponds to a precoding matrix index of a base station preferred by a user equipment on the basis of such a measurement value (metric) as signal-to-interference plus noise ratio (SINR) and the like. In order to reduce feedback overhead of precoding information, a method of sharing a codebook shared by the transmitting end and the receiving end including various precoding matrices in advance and performing a feedback of an index for indicating a specific precoding matrix of the corresponding codebook only.

The CQI corresponds to information indicating channel quality or channel strength. The CQI can be represented by a combination of a predetermined modulation and coding scheme (MCS). In particular, a CQI index to be fed back may indicate a corresponding modulation scheme and a code rate. In general, the CQI may become a value reflecting a reception SINR, which is obtainable in case that a base station forms a spatial channel using the PMI.

A system supporting an expanded antenna configuration (e.g., LTE-A system) considers obtaining additional multi-user diversity by using a multiple user-MIMO (MU-MIMO) scheme. Since interference channel exists between user equipments, which are multiplexed in an antenna domain, in the MU-MIMO scheme, if a base station performs a DL transmission using the channel state information fed back by one user equipment of the multiple users, it is necessary to make interference for a different user equipment not occur. Hence, in order to properly perform an MU-MIMO operation, channel state information having higher accuracy compared to a single user-MIMO (SU-MIMO) scheme should be fed back.

As mentioned in the foregoing description, in order to measure and report more accurate channel state information, a new CSI feedback method, which is upgraded from the CSI consisted of a conventional RI, the PMI, and the CQI, can be applied. For instance, the precoding information fed back by the receiving end can be indicated by a combination of 2 PMIs. One (first PMI) of the 2 PMIs including a property of long term and/or wideband can be called a W1. Another one (second PMI) of the 2 PMIs including a property of short term and/or subband can be called a W2. A final PMI can be determined by a combination (or function) of the W1 and the W2. For instance, if the final PMI corresponds to W, it can be defined as 'W=W1*W2' or 'W=W2*W1'.

In this case, the W1 reflects a frequency of a channel and/or an average characteristic on time. In other word, the W1 can be defined as the channel state information reflecting a characteristic of a long term channel on time, a characteristic of a wideband channel on frequency, or both the characteristic of a long term channel on time and the characteristic of a wideband channel on frequency. In order to briefly represent the characteristic of the W1, the present specification calls the W1 as the channel state information of long term-wideband property (or, long term-wideband PMI).

Meanwhile, the W2 reflects relatively instantaneous channel characteristic compared to the W1. In other word, the W2 can be defined as the channel state information reflecting a characteristic of a short term channel on time, a characteristic of a subband channel on frequency, or both the characteristic of a short term channel on time and the characteristic of a subband channel on frequency. In order to briefly represent the characteristic of the W2, the present specification calls the W2 as the channel state information of short term-subband property (or, short term-subband PMI).

In order to determine one final precoding matrix (W) from the informations (e.g., the W1 and the W2) of 2 properties different from each other indicating channel state, it is necessary to configure a separate codebook (in particular, a first codebook for the W1 and a second codebook for the W2) consisted of precoding matrices indicating the channel information of each property. A form of the codebook configured according to the aforementioned way can be called a hierarchical codebook. And, to determine a codebook to be finally used using the hierarchical codebook can be called a hierarchical codebook transformation.

As an example of the hierarchical transformation, a codebook can be transformed using a long term covariance matrix of a channel as shown in the following Formula 12.

$$W = \text{norm}(W1\,W2) \quad \text{[Formula 12]}$$

In Formula 12, the W1 (long term-wideband PMI) indicates an element (i.e., codeword) constructing a codebook (e.g., first codebook) designed to reflect the channel information of a long term-wideband property. In particular, the W1 corresponds to a precoding matrix included in the first codebook reflecting the channel information of the long term-wideband. Meanwhile, the W2 (short term-subband PMI) indicates a codeword constructing a codebook (e.g., second codebook) designed to reflect the channel information of a short term-subband property. In particular, the W2 corresponds to a precoding matrix included in the second codebook reflecting the channel information of the short term-subband. W indicates a codeword of a final transformed codebook. norm (A) means a matrix that a norm according to each column of a matrix A is normalized to 1.

For instance, the W1 and the W2 may have a structure shown in the following Formula 13.

$$W1(i) = \begin{bmatrix} X_i & 0 \\ 0 & X_i \end{bmatrix} \quad \text{[Formula 13]}$$

$$W2(j) = \begin{bmatrix} \overbrace{e_M^k \quad e_M^l \quad \cdots \quad e_M^m}^{r\ columns} \\ \alpha_j e_M^k \quad \beta_j e_M^l \quad \gamma_j e_M^m \end{bmatrix} \text{(if rank} = r\text{)}$$

In Formula 13, the W1 can be defined as a form of a block diagonal matrix and each block corresponds to an identical matrix ($X_i$). One block ($X_i$) can be defined as a matrix of ($N_t/2$)×M size. In this case, the $N_t$ corresponds to the number of transmitting antenna. In Formula 13, $e_M^p$ (p=k, l, ..., m) of the W2 is a vector of M×1 size. The vector indicates that $p^{th}$ component is 1 and the rest of components are 0 among the M number of vector components. In case of multiplying the $e_M^p$ by the W1, since the $p^{th}$ column is selected among the columns of the W1, this sort of vector is called a selection vector. In this case, as a value of M increases, the number of vectors fed back at a time increases to represent the long term/wideband channel. By doing this, feedback accuracy becomes higher. Yet, as the value of M increases, the codebook size of the W1, which is fed back with low frequency, is diminished and the codebook size of the W2, which is fed back with high frequency, is increased. As a result, feedback overhead increases. In particular, there exists a tradeoff between the feedback overhead and the feedback accuracy. Hence, the M value can be determined not to make the feedback overhead increase too much while maintaining appropriate feedback accuracy. Meanwhile, $\alpha_j, \beta_j, \gamma_j$ of the W2 indicate prescribed phase values, respectively. In Formula 13, '1≤k, l, m≤M' and each of k, l, m is an integer.

The codebook structure shown in Formula 13 is a structure designed to well reflect a correlation property of a channel, which occurs in case that a cross polarized (X-pol) antenna configuration is used and a space between antennas is dense (commonly, in case that a distance between neighboring antennas is less than a half of a signal wavelength). For instance, the cross-polarized antenna configuration can be represented as a Table 1 as follows.

TABLE 1

| 2Tx cross-polarized antenna configuration | 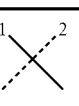 |
| --- | --- |
| 4Tx cross-polarized antenna configuration | 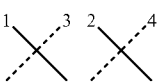 |

TABLE 1-continued

| 8Tx cross-polarized antenna configuration | |
|---|---|
| 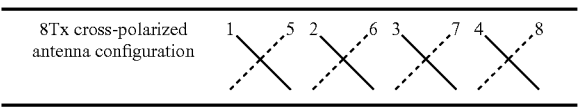 | |

In Table 1, an 8Tx cross-polarized antenna configuration can be represented as the 8Tx cross-polarized antenna configuration is configured with 2 antenna groups having a property of orthogonal to each other. Antennas (antenna 1, 2, 3, and 4) of an antenna group 1 have an identical polarization (e.g., vertical polarization) and antennas (antenna 5, 6, 7, and 8) of an antenna group 2 may have an identical polarization (e.g., horizontal polarization). And, the two antenna groups are located at an identical location (co-located). For instance, antenna 1 and 5 can be installed in a same place, antenna 2 and 6 can be installed in a same place, antenna 3 and 7 can be installed in a same place, and antenna 4 and 8 can be installed in a same place. In other word, the antennas belonging to one antenna group have an identical polarization such as a uniform linear array (ULA) and correlation between antennas within one antenna group has a property of linear phase increment. And, correlation between antenna groups has a property of phase rotation.

Since a codebook corresponds to a quantized channel value, it is necessary to design the codebook in a manner of reflecting the characteristic of a practical channel as it is. In order to explain that the characteristic of practical channel is reflected to the codeword of the codebook designed like Formula 13, a rank 1 codebook is explained as an example. In the following description, Formula 14 indicates an example that a final codeword (W) is determined in a manner of multiplying a W1 codeword by a W2 codeword in case of a rank 1.

$$W1(i) * W2(j) = \begin{bmatrix} X_i(k) \\ \alpha_j X_i(k) \end{bmatrix}$$ [Formula 14]

In Formula 14, the final codeword is represented by a vector of $N_t \times 1$ and is structured by two vectors corresponding to a upper vector $X_i(k)$ and a lower vector $\alpha_j X_i(k)$. The upper vector $X_i(k)$ indicates the correlation characteristic of a horizontal polarization antenna group of a cross polarization antenna and the lower vector $\alpha_j X_i(k)$ indicates the correlation characteristic of a vertical polarization antenna group. And, the $X_i(k)$ can be represented by a vector (e.g., DFT matrix) having linear phase increment by reflecting the correlation characteristic between antennas belonging to each of the groups.

In case of using the aforementioned codebook, it enables to perform a channel feedback of higher accuracy compared to a case of using a single codebook. Hence, a single-cell MU-MIMO may be enabled by using the channel feedback of higher accuracy. With a similar reason, CoMP operation requires a channel feedback of higher level of accuracy as well. For instance, In case of a CoMP JT operation, since a plurality of base stations cooperatively transmit an identical data to a specific UE, it can be theoretically considered as a MIMO system where a plurality of antennas are geographically distributed. In particular, similar to the single-cell MU-MIMO, in case of performing a MU-MIMO operation in the CoMP JT, high level of accuracy of channel information is required to avoid interference between co-scheduled UEs. And, in case of a CoMP CB operation, elaborate channel information is required as well to avoid the interference affecting a serving cell by a neighboring cell.

Inter-Cell Interference Coordination (ICIC)

Interference between neighboring cells may cause a problem in the aforementioned heterogeneous network environment and/or the CoMP environment. In order to solve the problem of inter-cell interference, inter-cell interference coordination can be applied. A conventional ICIC can be applied to a frequency resource or a time resource.

As an example of the ICIC for the frequency resource, 3GPP LTE release-8 system divides a given whole frequency domain (e.g., system bandwidth) into one or more sub domains (e.g., physical resource block (PRB) unit) and defines a method of exchanging an ICIC message for each of the frequency sub domains between cells. For instance, as the information included in the ICIC message for the frequency resource, relative narrowband transmission power (RNTP) related to a DL transmit power is defined and UL interference overhead indication (IOI) related to UL interference, UL high interference indication (HID, and the like are defined in the 3GPP LTE release-8 system.

The RNTP is the information indicating DL transmit power used by a cell transmitting an ICIC message on a specific frequency sub domain. For instance, if an RNTP field for the specific frequency sub domain is set to a first value (e.g., 0), it may mean that the DL transmit power of a corresponding cell does not exceed a prescribed threshold on the corresponding frequency sub domain. Or, if the RNTP field for the specific frequency sub domain is set to a second value (e.g., 1), it may mean that the corresponding cell cannot promise the DL transmit power on the corresponding frequency sub domain. In other word, if the value of the RNTP field corresponds to 0, the DL transmit power of the corresponding cell can be considered to be low. Yet, if the value of the RNTP field corresponds to 1, the DL transmit power of the corresponding cell cannot be considered to be low.

The UL IOI is the information indicating an amount of UL interference experienced (or received) by a cell transmitting an ICIC message on the specific frequency sub domain. For instance, if an IOI field for the specific frequency sub domain is set to a value corresponding to a large amount of interference, it may mean that the corresponding cell is experiencing strong UL interference on the frequency sub domain. Having received the ICIC message, the cell can schedule a user equipment using low transmit power among the user equipments served by the cell on the frequency sub domain corresponding to the IOI indicating strong UL interference. By doing so, since the user equipments perform UL transmission with a low transmit power on the frequency sub domain corresponding to the IOI indicating the strong UL interference, the UL interference experienced by a neighboring cell (i.e., the cell transmitted the ICIC message) can be reduced.

The UL HIT is the information indicating an extent of interference (or, UL interference sensitivity) capable of being occurred by a UL transmission for a corresponding frequency sub domain in a cell transmitting the ICIC message. For instance, if a HII field is set to a first value (e.g., 1) for a specific frequency sub domain, it may mean that the cell transmitting the ICIC message is likely to schedule a user equipment of a strong UL transmit power for the corresponding frequency sub domain. On the other hand, if the HII field is set to a second value (e.g., 0) for the specific frequency sub domain, it may mean that the cell transmitting the ICIC message is likely to schedule a user equipment of a weak UL transmit power for the corresponding frequency sub domain. Meanwhile, having received the ICIC message, the cell preferentially schedules a user equipment for the frequency sub domain where the HII field is set to the second value (e.g., 0) and schedules a user equipment capable of well operating despite of strong interference for the frequency sub domain where the FII field is set to the first value (e.g., 1), thereby avoiding the interference from the cell transmitted the ICIC message.

Meanwhile, as an example of an ICIC for the time resource, 3GPP LTE release-10 system divides a given whole time domain into one or more sub domains (e.g., subframe unit) and defines a method of exchanging whether each of the time sub domains is silent between cells. The cell transmitting an ICIC message can deliver the information indicating that a silencing is performed in a specific subframe to neighbor cells and does not schedule PDSCH or PUSCH in the corresponding subframe. Meanwhile, a cell receiving the ICIC message can schedule UL and/or DL transmission for a user equipment in the subframe where the silencing is performed in the cell transmitted the ICIC message.

The silencing may mean that a specific cell does not perform (or performs transmission of 0 or weak power) an operation of most of signal transmission in UL and DL in a specific subframe. As an example of the silencing operation, the specific cell can configure the specific subframe as a multicast broadcast single frequency network (MBSFN) subframe. In a DL subframe configured as the MBSFN subframe, a signal is transmitted in a control region only and the signal is not transmitted in a data region. As a different example of the silencing operation, an interfering cell may configure the specific subframe as an almost blank subframe (ABS) or an ABS-with-MBSFN. The ABS means a subframe transmitting a CRS only in the control region and the data region of a DL subframe and the subframe where other control information and data are not transmitted (or, performs transmission of a weak power only). Yet, such a DL channel as PBCH, PSS, SSS, and the like and a DL signal can be transmitted in the ABS. The ABS-with-MBSFN indicates a case that the CRS of the data region is not transmitted in the aforementioned ABS. As mentioned in the foregoing description, the silencing can be performed in a specific subframe unit and the information indicating whether the silencing is performed can be called a silent subframe pattern.

And, a silent subframe explained in the embodiment of the present invention can be understood as a subframe to which no signal is transmitted or the subframe to which a weak signal is transmitted. For clarity of explanation, although the silent subframe is exemplarily explained as the subframe to which no signal is transmitted in the following description, the principle of the present invention can be identically applied to a case that a signal of weak power is transmitted in the silent subframe as well.

As mentioned in the foregoing description, the ICIC information (e.g., RNTP, IOI, HID on the frequency resource is defined as the information to be applied to a specific frequency sub domain in all subframes without an indication indicating which subframe is applied by the information. The ICIC information (e.g., silent subframe pattern) on the time resource is defined as the information to be applied to all frequency domain without an indication indicating which frequency domain is applied by the information. Hence, if one cell transmits both the ICIC message for the frequency resource and the ICIC message for the time resource to neighboring cells, the time and frequency resource to which an ICIC operation is applied cannot be clearly specified. For instance, if it is considered both the information that a silencing is applied in a specific subframe without decision for a frequency domain and the information that DL transmit power exceeds a prescribed threshold value on a specific frequency sub domain without decision for the time domain, it becomes impossible to determine whether a silencing is performed or a strong DL transmission is performed on a corresponding frequency sub domain in a corresponding subframe.

In the following description, embodiments of the present inventions capable of clearly determining which ICIC operation is performed in case that the ICIC information on the frequency resource and the ICIC information on the time resource exist in a manner of being mixed are explained.

The present invention can specify a position of a different cell on a time resource based on a position where an ICIC operation of one cell is performed in a manner of considering a difference of subframe timing even in a case that a subframe boundary between cells is not matched with each other. The principle proposed by the present invention can be identically applied based on the above mentioned. Yet, for clarity of explanation, assume that the subframe boundary of two cells performing the ICIC operation is arrayed in the following description. In particular, assume that a start timing of a subframe of one cell is matched with the start timing of a subframe of a different cell.

And, in the following description, a cell determining and transmitting a silent subframe pattern corresponds to an interfering cell (or aggressor cell) and a cell receiving a silent subframe pattern of a neighboring cell may correspond to an interfered cell (or victim cell).

Embodiment 1

The present embodiment describes an ICIC operation of each cell in case that a silent subframe pattern of one cell is applied together with RNTP information.

For clarity of explanation, a cell transmitting ICIC information (e.g., an RNTP, an IOI, an HII, or a silent subframe pattern) is called a first cell and a cell receiving the ICIC information is called a second cell in the following description. In particular, assume that the first cell informs the second cell of the information of the RNTP, the IOI, the HII, and the like of the first cell while informing the second cell of the subframe pattern of which a silencing is performed, by which the present embodiment may be non-limited to this. In case that the ICIC information of one cell is received by one or more neighboring cells, the principle of the present invention can be identically applied.

Figure 7:
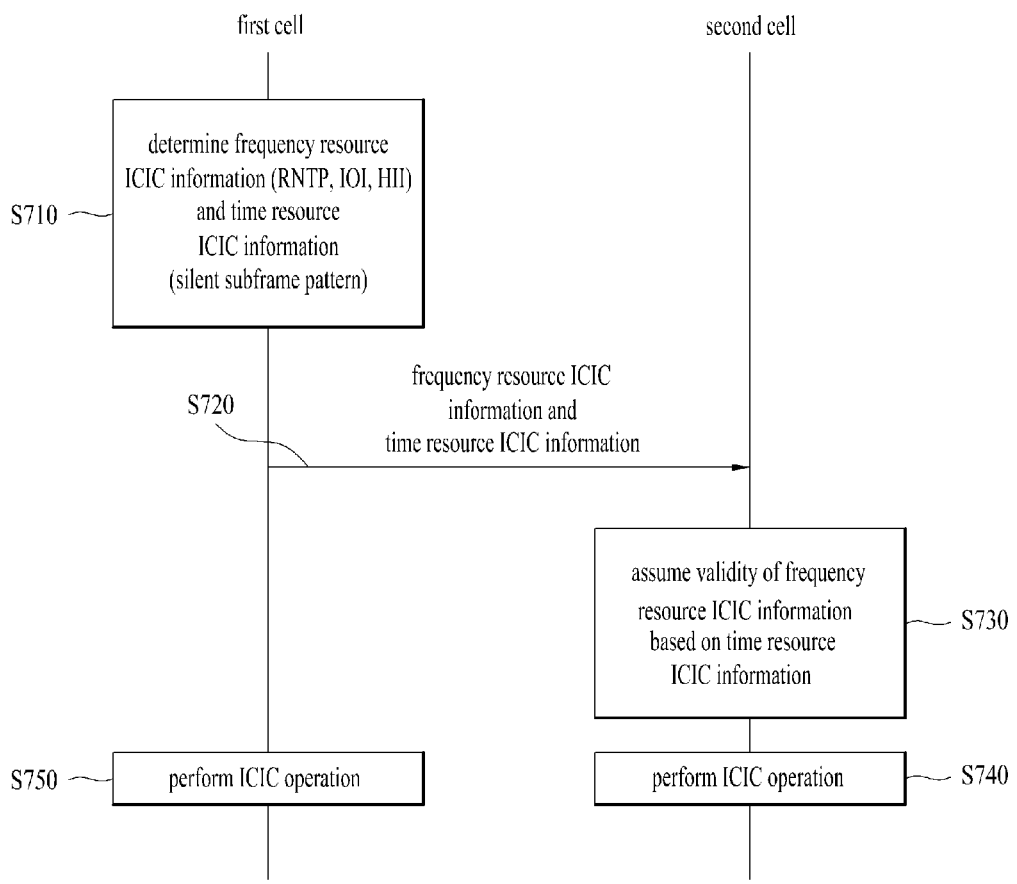
FIG. 7 is a flowchart showing an example of the present invention for an ICIC operation in case that ICIC information on a time and frequency resource of one cell is delivered to a different cell.

FIG. 7 is a flowchart showing an example of the present invention for an ICIC operation in case that ICIC information on a time and frequency resource of one cell is delivered to a different cell.

In the step S710, the first cell determines frequency resource ICIC information (e.g., RNTP) and time resource ICIC information (e.g., silent subframe pattern) and can transmit the determined frequency resource and time resource ICIC information to the second cell in the step S720.

In the step S730, the second cell can assume validity of the frequency resource ICIC information based on the time resource ICIC information received from the first cell. For instance, if the first cell indicates a DL subframe n as a silent subframe, it means that there is no PDSCH transmission of the first cell in the subframe n. More specifically, it means that there is no PDSCH transmission of the first cell on all frequency domains of the subframe n. Hence, since DL transmit power of the first cell in the subframe n is set to very low (in particular, only the power according to a minimum signal transmission) on all frequency domains, it is preferable to assume that the RNTP information indicating relative strength of the transmit power of the first cell on the basis of a prescribed threshold value does not have any meaning in the RNTP.

Subsequently, the second cell can assume that there is no application of the RNTP indication of the first cell (or does not interpret the RNTP indication) in the DL subframe indicated by the first cell as the silent subframe. Or, the second cell ignores the RNTP field value transmitted by the first cell for the silent subframe of the first cell and can override all frequency sub domains in a manner of setting the RNTP value of the first cell to 0 (in particular, the DL transmit power is lower than a prescribed threshold value). In other word, it is possible to say that the second cell considers the RNTP indication of the first cell as valid only in the subframe(s) where the first cell did not configure the subframe(s) as the silent subframe.

According to the method of considering the silent subframe pattern together with the RNTP information in the foregoing description, in case of the frequency sub domain (or, the frequency sub domain not indicated that the transmit power of the first cell is lower than a prescribed threshold value) not received the content, which indicates that inter-cell interference of the first cell will be reduced, via the RNTP indication, the second cell can freely perform a DL scheduling in the subframe configured as the silent subframe by the first cell regardless of the inter-cell interference [S730]. By doing this, efficiency of resource utilization can be enhanced.

Although the first cell indicates an extent of DL transmit power of the first cell for a specific frequency sub domain, the first cell can predict that the RNTP transmitted to the second cell is not valid in the DL subframe of which the first cell has configured it as the silent subframe [S750]. In particular, the first cell anticipates that the second cell, which has received the RNTP, may cause strong interference in DL for all frequency resources in the silent subframe of the first cell irrespective of the RNTP and can perform DL scheduling of the first cell.

Embodiment 2

The present embodiment describes an ICIC operation of each cell in case that a silent subframe of one cell is applied together with IOI/HII information. Since the present embodiment relates to UL transmission, the UL transmission and timing relationship between scheduling information transmission and the UL transmission are explained in advance.

PUSCH transmission in UL subframe n+k can be performed according to scheduling information (i.e., UL grant information) received in DL subframe n. In this case, in case of a FDD system, k value may be fixed to 4 and can be determined according to the following Table 2 and Table 3 in case of a TDD system.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 3

| TDD UL/DL Configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 6 | | | | 4 | 6 | |
| 1 | | | 6 | | | 4 | | | 6 | 4 |
| 2 | | | 4 | | | | | 4 | | |
| 3 | 4 | | | | | | | 4 | 4 | |
| 4 | | | | | | | | | 4 | 4 |
| 5 | | | | | | | | | 4 | |
| 6 | 7 | 7 | | | | | 7 | 7 | | 5 |

Table 2 indicates the configuration for a UL subframe and a DL subframe in a 3GPP LTE TDD system. In Table 2, D indicates a DL subframe, U indicates a UL subframe, and S indicates a special subframe. The special subframe is a subframe including the DwPTS, the GP, and the UpPTS described in FIG. 2. Meanwhile, Table 3 indicates transmission timing difference (i.e., k) between PDCCH and PUSCH in a 3GPP LTE TDD system. For instance, in case of TDD UL/DL configuration 0, UL grant information received on PDCCH in a DL subframe 5 may correspond to the scheduling information on PUSCH transmission in UL subframe 9 (=5+4) (i.e., k=4).

The present embodiment is explained with reference to FIG. 7.

In the step S710, the first cell determines frequency resource ICIC information (e.g., IOI and/or HII) and time resource ICIC information (e.g., silent subframe pattern) and can transmit the determined frequency resource and the time resource ICIC information to the second cell in the step S720.

In the step S730, the second cell can assume validity of the frequency resource ICIC information based on the time resource ICIC information received from the first cell. First of all, the second cell can assume as follows based on the time resource ICIC information.

For instance, if a DL subframe n is configured as a silent subframe, there is no PDCCH transmission in the subframe n. Hence, PUSCH transmission in a subframe n+k is also not performed. For instance, in case that the first cell configures the DL subframe n as the silent subframe and informs the second cell of the silent cell, the second cell can know that the first cell will not perform PUSCH transmission in UL subframe n+k without any separate information.

And, the second cell can assume validity of the frequency resource ICIC information (IOI or HII) received together with the time resource ICIC information as follows. In this case, the IOI or the HII provided to the second cell by the first cell has no meaning for the at least UL subframe n+k. In particular, the IOI of the first cell indicates the extent of UL interference experienced by the first cell on a specific frequency sub domain and the HII of the first cell indicates strong interference caused by the first cell on the specific frequency sub domain. Since the first cell does not perform the UL transmission in the subframe n+k, the IOI or the HII of the first cell becomes the information not necessarily to be considered by the second cell in the subframe n+k.

In the step S730, the IOI is explained in more detail. In case that the second cell receives the information indicating that the first cell configures a DL subframe n as the silent subframe, it can be assumed that UL IOI of the first cell is not applied in the subframe n+k. Or, the second cell ignores the IOI value transmitted by the first cell for the subframe n+k and can override all frequency sub domains in a manner of setting the IOI value of the first cell to 0 (in particular, the DL interference experienced by the first cell is low). In other word, it is possible to say that the second cell considers the UL IOI information of the first cell as valid only in the subframe n+k where the subframe n is not configured as the silent subframe.

According to the method of considering the silent subframe pattern together with the IOI information in the foregoing description, in case of the frequency sub domain (or, the frequency sub domain indicating that the first cell is experiencing strong UL interference) received the content, which indicates that inter-cell interference need to be reduced, via the UL IOI of the first cell, if the first cell configured the subframe n as the silent subframe, the second cell can freely perform a UL scheduling in the subframe n+k regardless of the inter-cell interference [S740]. By doing this, efficiency of resource utilization can be enhanced.

Although the first cell indicates that interference overload is high for the specific frequency sub domain, if the first cell configures the DL subframe n as the silent subframe, the first cell can predict that the IOI transmitted to the second cell is not valid in the UL subframe n+k [S750]. In particular, the first cell anticipates that the second cell, which received the UL IOI, may cause strong interference in UL for all frequency resources in the UL subframe n+k irrespective of the IOI of the first cell. By doing so, the first cell can perform UL scheduling of the first cell.

Subsequently, an HII case in the step S730 is explained. Similar to the aforementioned IOI, the first cell can transmit HII information indicating that the first cell causes strong UL interference on a specific frequency sub domain together with the information indicating that the subframe n is configured as the silent subframe to the second cell. In this case, if the subframe n is configured as the silent subframe, the second cell can assume that there is no PUSCH transmission of the first cell in the subframe n+k and the UL HII of the first cell is not applied to the subframe n+k. Or, the second cell ignores the HII value transmitted by the first cell for the subframe n+k and can override all frequency sub domains in a manner of setting the HII value of the first cell to 0 (in particular, the DL interference caused by the first cell is low). In other word, it is possible to say that the second cell considers the UL HII information of the first cell as valid only in the subframe n+k where the subframe n is not configured as the silent subframe.

As mentioned in the foregoing description, according to a method of considering both the silent subframe pattern and the HII information, if the first cell configures the subframe n as the silent subframe, the second cell can freely perform UL scheduling on a frequency sub domain indicated by high interference sensitivity (or, the frequency sub domain where the first cell causes strong UL interference) irrespective of the inter-cell interference in the subframe n+k [S740]. By doing so, efficiency of resource utilization can be enhanced.

Although the first cell indicates the extent of the UL interference caused by the first cell for the specific frequency sub domain, if the first cell configures the DL subframe n as the silent subframe, the first cell can predict that the HII transmitted to the second cell is not valid in the UL subframe n+k [S750]. In particular, the first cell anticipates that the second cell, which received the UL HII, may cause strong interference in UL for all frequency resources in the UL subframe n+k irrespective of the HII of the first cell. By doing so, the first cell can perform UL scheduling of the first cell.

Embodiment 3

The present embodiment explains on resource determination to measure interference in case that the time resource ICIC information and the frequency resource ICIC information of one cell are applied together.

An interfering cell can change transmit power in a time domain (e.g., configuration of a silent subframe pattern) or can change the transmit power on a frequency domain (e.g., RNTP configuration). If an interfered cell performs interference measurement in a manner of calculating an average of the interference of all resource domains without considering the transmit power, which varies in time/frequency domain, of the interfering cell, a result of the interference measurement may represent interference characteristic for a total frequency/time resource. Yet, the result cannot be used for the interference characteristic of a specific time/frequency resource. Hence, if a delicate interference characteristic for a specific time/frequency resource cannot be determined, it becomes difficult to select an appropriate MCS for the corresponding specific time/frequency resource. For instance, in order for a user equipment to properly calculate CSI for a specific time/frequency resource domain, interference measurement for the corresponding specific time/frequency resource domain should be properly performed.

To this end, it is possible to enable the interference measurement in the interfered cell to be performed in a manner of limiting to a specific time/frequency resource domain, which is expected to have an identical (or similar) interference level. For instance, a user equipment can perform the interference measurement in a manner of obtaining the average of the interference only in a specific time/frequency resource domain. To this end, a base station can inform the user equipment of the information capable of determining the time/frequency resource domain, which is limited for the interference measurement of the user equipment, via an upper layer signaling (e.g., RRC signaling).

Hence, in case of performing the interference measurement for a limited resource, the ICIC information (e.g., silent subframe pattern) on the time resource of the interfering cell and the ICIC information (e.g., RNTP, IOI, HII) on the frequency resource can be considered together. In this case, similar to the aforementioned embodiments, in terms of the interfered cell, it may be unclear whether the interfering cell performs a silencing in the specific time/frequency resource or a DL transmission of strong power level.

Hence, in case that the base station informs the user equipment of a resource to perform the interference measurement, it is able to consider that the RNTP of a corresponding cell has no meaning (in particular, low interference is expected on all frequency bands in the silent subframe) in a silent subframe of an interfering cell. For instance, in case that the user equipment performs interference measurement limited to a specific frequency resource, if the interfering cell performs a silencing in a specific subframe while low interference resource is working with the corresponding specific frequency resource, the user equipment can perform limitless interference measurement for all frequency domains in the silent subframe of the interfering cell. To this end, the base station can inform the user equipment of the information on a set of subframes (in particular, the subframe permitted to measure interference for all bands), which correspond to the exception of the interference measurement for the limited frequency resource, via an upper layer signal.

As mentioned in the foregoing description, in case that the time resource ICIC information of the interfering cell and the frequency resource ICIC information are provided at the same time, the interfered cell determines whether the frequency resource ICIC information is applied based on whether the interfering cell performs a silencing in a specific subframe, thereby efficiently and properly performing the interference measurement on the time/frequency resource having identical (or similar) interference characteristic.

Embodiment 4

The present embodiment describes an ICIC operation of each cell in case that time resource ICIC information of one cell and frequency resource ICIC information of a different cell are exchanged with each other.

Figure 8:
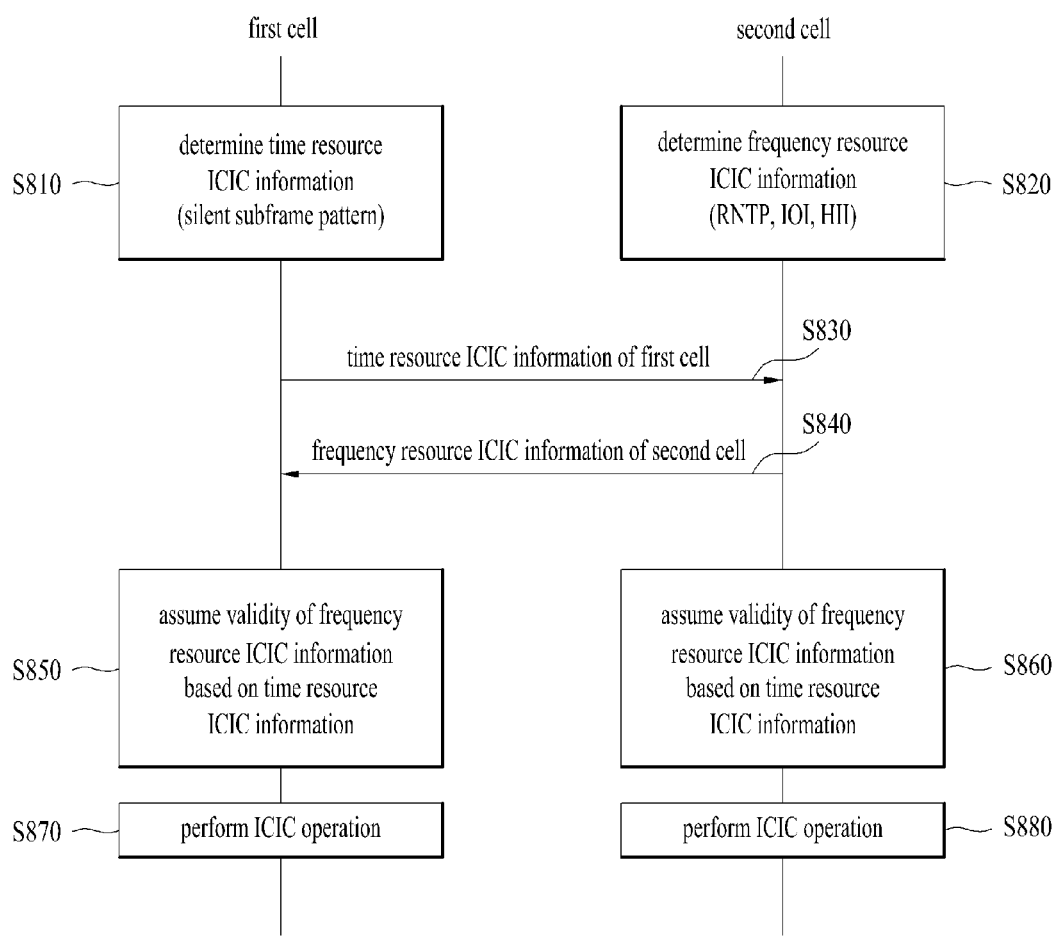
FIG. 8 is a flowchart showing an example of the present invention for an ICIC operation in case that ICIC information on a time resource of one cell and the ICIC information on a frequency resource of a different cell are exchanged with each other.

FIG. 8 is a flowchart showing an example of the present invention for an ICIC operation in case that ICIC information on a time resource of one cell and the ICIC information on a frequency resource of a different cell are exchanged with each other.

As shown in FIG. 8, a first cell corresponds to a cell determining [S810] and transmitting [S830] the ICIC information (e.g., silent subframe pattern) on a time resource of the first cell and a second cell can receive the ICIC information on a time resource of the first cell. And, the second cell corresponds to a cell determining [S820] and transmitting [S840] the ICIC information (e.g., RNTP, IOI, HID on a frequency resource and the first cell can receive the ICIC information on a frequency resource.

Embodiment 4-1

The present embodiment describes an ICIC operation of each cell in case that the RNTP of the second cell is applied to a silent subframe of the first cell.

Assume that the first cell configures a DL subframe n as a silent subframe [S810] and informs the second cell of the silent subframe [S830]. In this case, the second cell configures a specific frequency sub region as a low DL transmit power region [S820] and can inform the first cell of the specific frequency sub region via the RNTP [S840].

In this case, in terms of the second cell, since the DL subframe n corresponds to a resource where the first cell performs a silencing operation for all bands, if the second cell also applies a low DL transmit power to the subframe n on the specific frequency sub domain, which is configured with the RNTP, a corresponding frequency resource of the corresponding subframe n cannot be sufficiently used by both the first cell and the second cell. In order to solve this sort of inefficiency, each of the first cell and the second cell can assume the validity of the time resource ICIC information of the first cell and the validity of the RNTP information of the second cell as follows.

The first cell ignores the RNTP transmitted by the second cell for the DL subframe n, which is configured as the silent subframe by the first cell, and can assume that the second cell uses high DL transmit power on all frequency bands [S850].

For the DL subframe n, which is configured as the silent subframe by the first cell, the second cell can also use the high transmit power on a specific frequency sub band, which is configured as the low DL transmit power region according to the RNTP determined by the second cell [S860].

In particular, in the step S850 and S860, both the first cell and the second cell can assume that the RNTP of the second cell is not valid in the subframe, which is configured as the silent subframe by the first cell. According to the assumption for the RNTP, the operation of each cell can be defined as follows.

The first cell can inform user equipments belonging to the first cell via an upper layer signal of a fact that strong interference can occur on all frequency bands in a specific subframe [S870]. Hence, when the user equipments of the first cell perform measurement on CSI for a specific frequency sub band or RSRQ (reference signal received quality), if the corresponding specific frequency sub band corresponds to a low interference region, the user equipments of the first cell can perform the measurement in a manner of excluding the specific subframe indicated by the upper layer signal. Or, when the user equipments of the first cell perform measurement, if the corresponding specific frequency sub band corresponds to a high interference region, the user equipments of the first cell assume that the measurement for all frequency bands has a property identical to the property of the measurement for the corresponding specific frequency sub band in the specific subframe indicated by the upper layer signal and can perform the measurement via such an operation as interpolation and the like.

The second cell can transmit information indicating that high transmit power will be used for all frequency bands in a specific subframe without following the RNTP transmitted by the second cell to the neighboring cells except the first cell [S880]. Having received the information, the neighboring cells can utilize the information received from the second cell in case of performing DL scheduling.

Embodiment 4-2

The present embodiment describes an ICIC operation of each cell in case that the HII of the second cell is applied to a silent frame of the first cell.

Referring to FIG. 8 again, the first cell configures a DL subframe n as a silent subframe [S810] and informs the second cell of the silent subframe [S830]. In this case, the second cell configures a specific frequency sub region as a low UL transmit power region or a high UL transmit power region [S820] and can inform the first cell of the specific frequency sub region via the HII [S840].

In this case, in case that a UL grant for a UL transmission in a UL subframe n+k is configured as a timing relation transmitted in a DL subframe n, if the DL subframe n is configured as the silent subframe in the first cell, it is possible to see that there is no practical UL transmission of the first cell in the UL subframe n+k. In this case, it is beneficial that the second cell uses high UL transmit power for all frequency bands in the UL subframe n+k irrespective of the HII transmitted by the second cell in terms of resource utilization efficiency. Hence, each of the first and the second cell can assume the validity of the time resource ICIC information of the first cell and the validity of the HII information of the second cell as follows.

If the DL subframe n is configured as the silent subframe by the first cell, the first cell ignores the HII transmitted by the second cell for the UL subframe n+k and can assume that the second cell uses high UL transmit power on all frequency bands [S850].

If the first cell configures the DL subframe n as the silent subframe, the second cell can also use high UL transmit power on a specific frequency sub band, which is configured as a low UL transmit power region according to the HII determined by the second cell [S860].

In particular, for the subframe n+k where the subframe n is configured as the silent subframe by the first cell, both the first and the second cell can assume that the HIT is not valid. According to the assumption for the HII, the operation of each cell can be defined as follows.

The first cell can perform UL scheduling for the user equipments served by the first cell in consideration of a point that the HII of the second cell is not valid in a specific UL subframe (the UL subframe n+k where the DL subframe n is configured as the silent subframe) [S870]. In this case, if UL grant information, which schedules PUSCH transmission in the UL subframe n+k, cannot be transmitted in the DL subframe n, which is the silent subframe, multi-subframe scheduling can be used. According to the multi-subframe scheduling, for instance, the UL grant information, which schedules PUSCH transmission in the UL subframe n+k, can be transmitted not in the DL subframe n but in a different DL subframe (e.g., DL subframe n−1). In this case, the UL grant information transmitted in the DL subframe n−1 may include a signaling field indicating that the PUSCH transmission scheduled by a corresponding UL grant is performed in the UL subframe n+k.

The second cell can inform different neighboring cells except the first cell of information indicating that high transmit power will be used for all frequency bands in a specific subframe without following the HII transmitted by the second cell. Having received the information, the neighboring cells can utilize the information received from the second cell in case of performing a UL scheduling The second cell can transmit information indicating that high transmit power will be used for all frequency bands in a specific subframe without following the HII transmitted by the second cell to the neighboring cells except the first cell [S880]. Having received the information, the neighboring cells can utilize the information received from the second cell in case of performing a UL scheduling.

Embodiment 4-3

The present embodiment describes an ICIC operation of each cell in case that the IOI of the second cell is applied to a silent frame of the first cell.

Referring to FIG. 8 again, the first cell configures a DL subframe n as a silent subframe [S810] and informs the second cell of the silent subframe [S830]. In this case, the second cell determines a specific frequency sub domain where the second cell is experiencing high level of interference [S820] and can inform the first cell of the specific frequency sub domain via the IOI [S840]. In particular, the second cell can transmit the IOI to the first cell to make a request for reducing the level of interference of the first cell on the specific frequency sub domain.

In this case, if the DL subframe n is configured as the silent subframe in the first cell, it is possible to see that there is no practical UL transmission of the first cell in the UL subframe n+k (in this case, assume that there is no application of a multi-subframe scheduling described in the embodiment 4-2). Hence, since the interference from the first cell for all frequency bands in the subframe n+k becomes low in terms of the second cell, it is able to be assumed that the IOI (or interference reduction request) of the second cell is automatically accepted in the subframe n+k [S860] and [S880].

Meanwhile, in terms of the first cell, since the UL transmission is not performed for all frequency bands including the specific frequency sub band, which is indicated by the IOI of the second cell as the second cell is experiencing high UL interference, in the subframe n+k, it is able to automatically obtain a result identical to a result obtainable after performing an operation according to the interference reduction request, without performing a separate ICIC operation according to a reception of the IOI of the second cell [S850] and [S870]. In other word, it is able to assume that the frequency sub bands of which the second cell makes a request for interference reduction via the IOI are limited to the content of the subframe where a UL scheduling is performed in the subframe, which is not configured as the silent subframe in the first cell.

Embodiment 5

The present embodiment describes a method of using an additional signal indicating validity of frequency resource ICIC information.

According to the present embodiment, the first cell and the second cell can exchange an additional signal indicating whether frequency resource ICIC information (e.g., RNTP, HII and IOI) is valid in a specific subframe. For instance, the first cell and the second cell can transmit a pattern indicating whether the frequency resource ICIC information is valid (or not valid) in a prescribed subframe in a form of a bitmap. The subframe where the frequency resource ICIC information is not valid may correspond to a silent subframe.

As a different example, the first cell and the second cell can transmit a signal indicating a frequency domain and a subframe where the frequency resource ICIC information is valid (or not valid). In particular, whether the frequency resource ICIC information is valid in a specific subframe and a specific frequency domain can be additionally indicated while the validity of the frequency domain ICIC information is simply indicated according to a subframe. Specifically, the first cell and the second cell can exchange a signal indicating that the frequency resource ICIC information is valid for all subframes on a specific frequency domain irrespective of a silent subframe configuration and the signal indicating that the frequency resource ICIC information is not valid for a part of the subframe(s) on a different specific frequency domain.

In this case, the frequency domain where the frequency resource ICIC information is valid in all subframes may correspond to the frequency domain used for a signal (e.g., periodical CSI report, SRS transmission, SPS (semi-persistent scheduling) PUSCH transmission) capable of being transmitted without a UL dynamic scheduling information received on PDCCH. To this end, the first cell and the second cell can exchange scheduling information (frequency domain assignment information used for transmitting the corresponding signal) of the signal capable of being transmitted without a dynamic scheduling.

Meanwhile, the frequency domain where the frequency resource ICIC information is not valid in a specific subframe may correspond to the frequency domain used for a signal capable of being transmitted by the UL dynamic scheduling information received on PDCCH. For instance, the second cell can freely schedule UL transmission on the frequency domain in a silent subframe of the first cell. And, if a subframe where a UL grant is received for a prescribed subframe of the first cell corresponds to the silent subframe, the second cell can freely perform UL transmission on the frequency domain in the corresponding subframe (in particular, if a subframe n corresponds to the silent subframe, subframe n+k).

Embodiment 6

In the aforementioned embodiments, in case that a DL subframe is set to a silent subframe, if a UL grant, which schedules UL transmission in a UL subframe, has a timing relation of which the UL grant is received from the DL subframe, it is assumed that the corresponding UL subframe implicitly correspond to the silent subframe as well. In particular, according to the aforementioned embodiments, it assumed a pairing relation indicating that if a DL subframe n is a silent subframe, a UL subframe n+k corresponds to the silent subframe as well. Yet, in order to more flexibly apply a silent subframe configuration, the silent subframe configuration for a DL silent subframe and a UL silent subframe can be separated. To this end, a bitmap message indicating a UL silent subframe pattern can be explicitly exchanged between cells via a backhaul link.

Hence, in case that the silent subframe configuration is separately given to a DL and a UL, assumption on whether a frequency resource ICIC information is valid in a specific subframe and an operation in each cell can be defined as follows.

First of all, it is explained a case that a DL subframe n of a first cell is a silent subframe and a UL subframe n+k is not a silent subframe. This sort of DL-UL subframe relation can be defined in case that such a scheme mentioned in the first cell as a multi-subframe scheduling and the like (e.g., a scheme performing UL transmission in the UL subframe n+k according to the UL grant received in a DL subframe n−1) is applied.

As shown in FIG. 7, in case that the first cell transmits frequency resource ICIC information (e.g., RNTP, IOI, HII) to the second cell, the second cell can assume that the RNTP of the first cell is not valid in the DL subframe n, which is a silent subframe. Yet, since the UL subframe n+k is not a silent subframe, the second cell can perform PUSCH scheduling and the like in a manner of assuming that the IOI and the HII of the first cell are valid.

Meanwhile, as shown in FIG. 8, in case that the second cell transmits frequency resource ICIC information to the first cell, the first and the second cell ignore the RNTP of the second cell in the DL subframe n, which is the silent subframe and can assume that the second cell performs DL transmission with higher transmit power in the DL subframe n. Meanwhile, since the UL subframe n+k is not a silent subframe, the IOI and the HII of the second cell can be assumed to be valid.

Subsequently, it is explained a case that the DL subframe n of a first cell is not a silent subframe and the UL subframe n+k is a silent subframe. In this case, it is possible to see that the first cell does not schedule PUSCH transmission in the UL subframe n+k in the DL subframe n.

As shown in FIG. 7, in case that the first cell transmits frequency resource ICIC information (e.g., RNTP, IOI, HII) to the second cell, since the DL subframe n is not a silent subframe, the second cell can assume that the RNTP of the first cell is valid. Meanwhile, since the UL subframe n+k corresponds to a silent subframe, the second cell can assume that the IOI and the HII of the first cell are not valid.

In this case, in terms of the second cell, it can be assumed that there is no interference from the first cell on all frequency domains of the UL subframe n+k. Hence, the second cell can be used for PUSCH transmission in the UL subframe n+k. Yet, if a normal DL-UL subframe pairing relation is applied to the second cell, the information of the second cell scheduling the PUSCH transmission in the subframe n+k is transmitted in the DL subframe n. Since the DL subframe n is the subframe of which the first cell does not configure it as a silent subframe, there may exist interference from the first cell. Hence, in order for the second cell to schedule PUSCH transmission in the UL subframe n+k in a manner of avoiding the interference from the first cell, the UL transmission in the UL subframe n+k is needed to be scheduled not in the DL subframe n but in a different DL subframe or the UL transmission in the UL subframe n+k can be scheduled in the DL subframe n if the interference of the first cell can be avoided. For instance, the multi-subframe scheduling scheme (e.g., the scheme performing PUSCH transmission of the UL subframe n+k according to the UL grant, which is transmitted in DL subframe n−1) can be applied. Or, the PUSCH transmission in the UL subframe n+k can be scheduled on a new control channel (e.g., e-PDCCH (evolved-PDCCH or enhanced-PDCCH)) transmitted in a manner of using a specific resource region (e.g., low frequency domain in time domain to which PDSCH of the first cell is transmitted) in the DL subframe n. Or, an operation for minimizing the influence of the interference of PDCCH and the like of the first cell in a manner of using PDCCH to which a higher aggregation level compared to a conventional PDCCH is applied can be applied.

Meanwhile, as shown in FIG. 8, in case that the second cell transmits the frequency resource ICIC information to the first cell, the first and the second cell can schedule DL transmission in consideration of an RNTP of the second cell in the DL subframe n, which is not a silent subframe. Meanwhile, since the UL subframe n+k corresponds to a silent subframe, the first and the second cell can operate in a manner of assuming that the IOI and the HII of the second cell are not valid.

As mentioned in the foregoing description, for the method of determining the validity of the frequency domain ICIC information (e.g., RNTP, IOI, HII) based on the time domain ICIC information (e.g., silent subframe pattern) proposed by the present invention, each of the items explained by the various embodiments of the present invention can be independently applied or two or more embodiments can be implemented in a manner of being simultaneously applied. For clarity, duplicated content is omitted.

Figure 9:
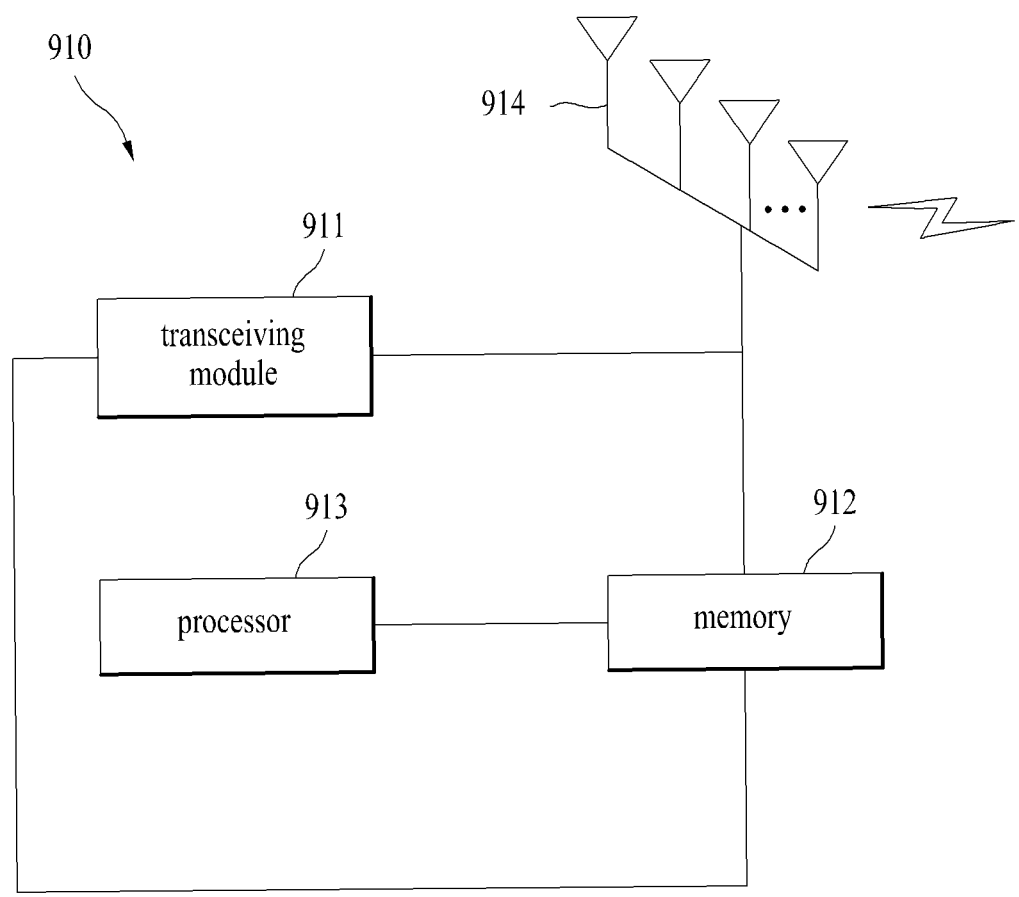
FIG. 9 is a diagram for a configuration of a base station device according to the present invention.

FIG. 9 is a diagram for a configuration of a base station device according to the present invention.

Referring to FIG. 9, the base station device 910 according to the present invention can include a transceiving module 911, a processor 912, a memory 913, and a plurality of antennas 914. A plurality of the antennas 914 means MIMO transmission and reception supportive of base station device. The transceiving module 911 can transmit and/or receive various signals, data, and information from a different cell and/or a user equipment. The processor 912 can control overall operations of the base station device 910.

The base station device 910 according to one embodiment of the present invention can be configured to perform inter-cell interference coordination (ICIC) in a wireless communication system. The base station device 910 depicted in FIG. 9 may correspond to either the base station device of the first cell or the base station device of the second cell. In particular, the first and the second cell may correspond to a sector of an identical base station or the base station device of the first cell and the base station device of the second cell may correspond to the base station device different from each other.

The processor 912 of the base station device of the first cell can be configured to transmit time domain ICIC information (e.g., silent subframe configuration information) of the first cell and frequency domain ICIC information (e.g., RNTP, UL IOI, UL HID of the first cell to the second cell via the transceiving module 911. And, the second cell assumes validity of the frequency domain ICIC information based on the time domain ICIC information of the first cell and operates according to the validity. The processor 912 of the base station device of the first cell can be configured to predict a result of the assumption performed by the second cell for the validity of the frequency domain ICIC information of the first cell. And, the processor 912 of the base station device of the first cell can be configured to make the first cell perform UL or DL scheduling based on a prediction result.

Meanwhile, the processor 912 of the second cell can be configured to receive the time domain ICIC information of the first cell and the frequency domain ICIC information of the first cell from the first cell via the transceiving module 911. And, the processor 912 of the base station device of the second cell can be configured to assume the validity of the frequency domain ICIC information of the first cell based on the time domain ICIC information of the first cell. The processor 912 of the base station device of the second cell can be configured to perform UL or DL scheduling of the second cell based on a result of the assumption.

Besides, the processor of the base station device 910 performs a function of calculating and processing the information received by the base station device 910, information to be transmitted to an external, and the like. The memory 913 can store the calculated and processed information and the like for a prescribed time and can be replaced by such a configuring element as a buffer (not depicted) and the like.

For the aforementioned detail configuration of the base station device, each of the items explained by the various embodiments of the present invention can be independently applied or two or more embodiments can be implemented in a manner of being simultaneously applied. For clarity, duplicated content is omitted And, in explaining FIG. 9, the explanation on the base station device 900 can be identically applied to a relay device as a main agent of DL transmission or a main agent of UL reception.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

Detailed explanation on the preferred embodiment of the present invention disclosed as mentioned in the foregoing description is provided for those in the art to implement and execute the present invention. While the present invention has been described and illustrated herein with reference to the preferred embodiments thereof, it will be apparent to those skilled in the art that various modifications and variations can be made therein without departing from the spirit and scope of the invention. For instance, those skilled in the art can use each component described in the aforementioned embodiments in a manner of combining it with each other. Hence, the present invention may be non-limited to the aforementioned embodiments of the present invention and intends to provide a scope matched with principles and new characteristics disclosed in the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The aforementioned embodiments of the present invention can be applied to various mobile communication systems.

What is claimed is:

1. A method of performing interference management in a wireless communication system, the method comprising:
    receiving a time domain interference management information including almost blank subframe information of a first cell; and
    receiving a frequency domain interface management information including an uplink interference overload indication (UL IOI) of the first cell and additional information including a bitmap from the first cell by a second cell, the additional information indicating applicability of the UL IOI in a plurality of subframes; and
    performing an uplink or a downlink scheduling on a subframe by the second cell in consideration of at least the time domain interference management information, the UL IOI and the applicability of the UL IOI indicated by the additional information for the subframe.

2. The method of claim 1, wherein the bitmap includes a plurality of bits each indicating whether the UL IOI of the first cell is applicable in each of the plurality of subframes.

3. The method of claim 1, wherein the bitmap is distinct from the almost blank subframe information included in the time domain interference management information.

4. The method of claim 1, wherein the UL IOI indicates an interference level experienced by the first cell on a frequency domain unit.

5. The method of claim 1, wherein the time domain interference management information of the first cell and the frequency domain interference management information of the first cell are applied to a time division duplex (TDD) system.

6. The method of claim 1, wherein the applicability of the UL IOI is verified without considering the almost blank subframe information.

7. A base station of performing interference management in a wireless communication system, the base station comprising:
    a transceiving module configured to transmit and receive a signal with a first cell; and
    a processor configured to control the base station including the transceiving module,
    wherein the transceiving module receives time domain interference management information including almost blank subframe information of a first cell, frequency domain interference management information including an uplink interference overload indication (UL IOI) of the first cell and additional information including a bitmap for the first cell, the additional information indicating applicability of the frequency domain interference management information in a plurality of subframes, and
    wherein the processor performs an uplink or a downlink scheduling on a subframe in consideration of at least the time domain interference management information, the UL JOT and the applicability of the frequency domain interference management information indicated by the additional information for the subframe.

* * * * *